Aug. 3, 1965   C. E. JOHNSON   3,197,872
INSTRUMENT FOR DETERMINING ANGLES
Filed Oct. 10, 1963   2 Sheets-Sheet 1

INVENTOR.
CARL E. JOHNSON
BY
Schroeder & Siegfried
ATTORNEYS

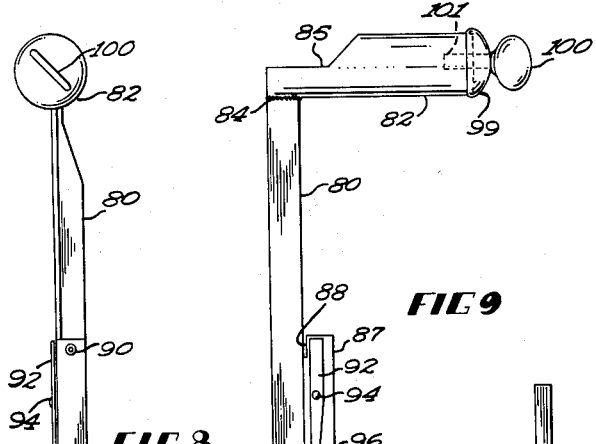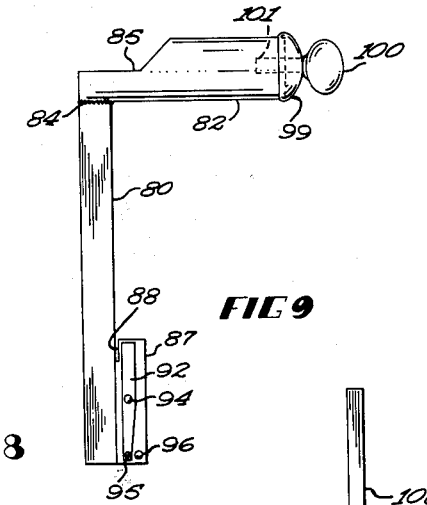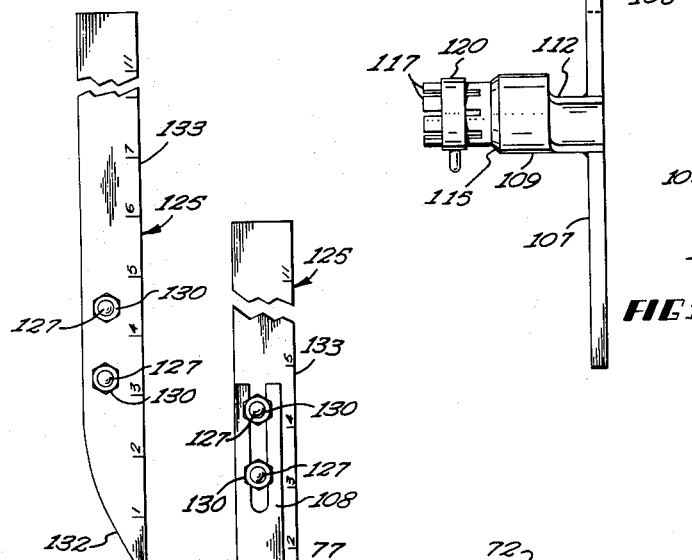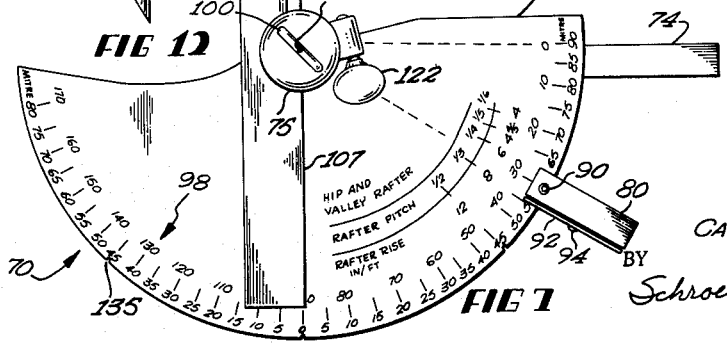

United States Patent Office 3,197,872
Patented Aug. 3, 1965

3,197,872
INSTRUMENT FOR DETERMINING ANGLES
Carl E. Johnson, Detroit Lakes, Minn.
(4457 Linden N., Seattle, Wash.)
Filed Oct. 10, 1963, Ser. No. 315,185
8 Claims. (Cl. 33—75)

My invention relates to an instrument for determining angles of cuts for rafters, mitre joints, siding cuts and the like, and more particularly, to an improved carpenters type gauge for indicating, aiding in the computation of and laying out various angle cuts on rafters, siding, stringers, mitre joints, and the like.

While gauges or instruments of this type are known and in use, they generally lack wide application because of the complexity and cost of the device or instrument, difficulty in the use of the same, and the limited surface on the gauges over which guide lines may be taken. These prior devices do not allow marking from the geometrical center of the instrument and as such, requires several operations in the proper marking of a board or object in which a cut is to be made. The instrument of the subject invention provides a simplified device which is so constructed that it may be readily used in the laying out of angles for cuts on rafters, sidings and other various structural components in a simplified application, which can be completely performed and repeated merely by a setting of the instrument. This improved gauge or instrument permits access to the geometric center of the same so that more complete layout or marking may be obtained in a single operation and when adjusted and clamped, may be utilized repeatedly without further adjustment. This gauge has associated therewith a scale in terms of various relationships for the layout of angles and structural components related to an angle scale to simplify the use of the same. In addition, the instrument is extremely rugged for day to day usage in the construction field. This improved gauge or instrument utilizes a scale plate having a reference flange secured thereon and an adjustable rule carrying member pivoted on the same so that the scale edge of the rule may extend to the geometric center of the instrument. The rule carrying member is so adjusted relative to the scale information that the desired angles of setting may be readily determined. When the instrument is so adjusted, the movable members of the same will be clamped to provide for repeatable markings of the same angle relationships. In addition, the invention includes an embodiment which permits the use of the instrument for the layout of multiple angles on construction members.

Therefore, it is an object of this invention to provide an improved instrument for determining angles and cuts for rafters, mitre joints, siding and the like.

Another object of this invention is to provide in an instrument of this type an arrangement of parts permitting ready access to the geometric center of the instrument for simplifying the use of the same and improving the accuracy in the use of the same.

Another object of this invention is to provide in a device or gauge of this type, relatively few parts which are easy to assemble and operate and will provide accurate measurements.

A still further object of this invention is to provide a device of this type which is rugged in construction, simple in design and economical to manufacture.

These and other objects of this invention will become apparent from a reading of the attached description together with the drawings wherein.

Figures 1, 6:
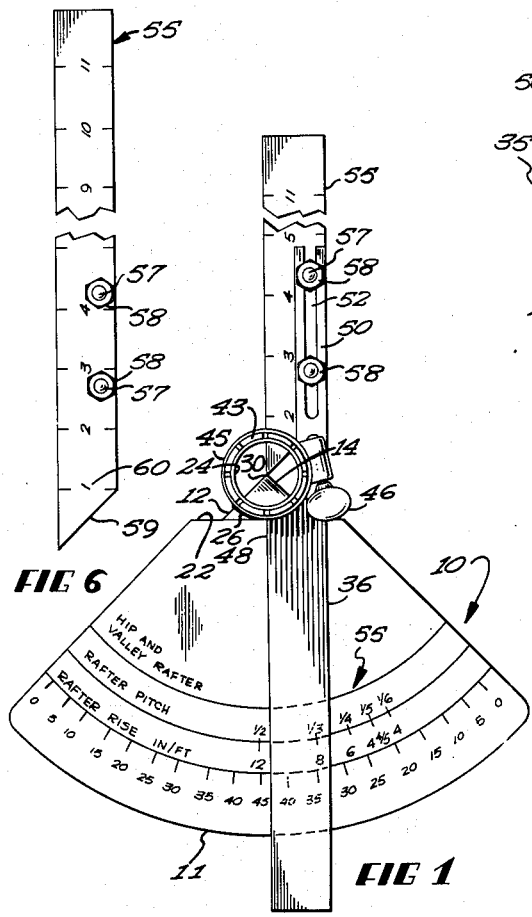
FIGURE 1 is a plan view of the first embodiment of the invention.
Figures 4, 5:
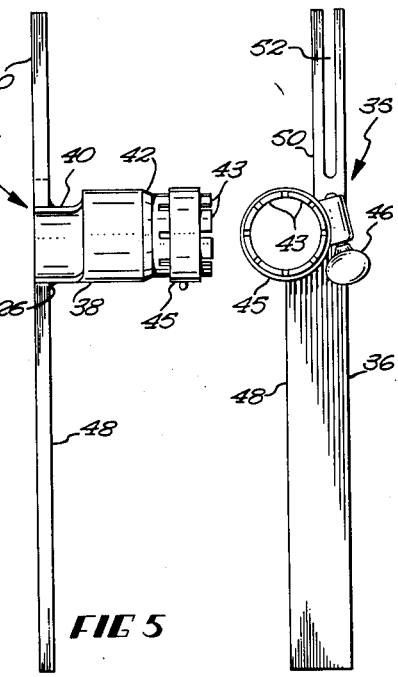

FIGURE 4 is a plan view of a rule carrying member of the instrument of FIGURE 1, FIGURE 5 is a side elevation view of the rule carrying member of FIGURE 4, FIGURE 6 is a plan view of the rule attached to the rule carrying member of FIGURES 4 and 5, FIGURE 7 is a plan view of a second embodiment of the improved instrument for measuring angles, FIGURE 8 is a plan view of a guide component of the instrument shown in FIGURE 7, FIGURE 9 is an elevation view of a guide component of the instrument shown in FIGURE 8, FIGURE 10 is an elevation view of a rule carrying member of the instrument shown in FIGURE 7, FIGURE 11 is a plan view of a rule carrying member of the instrument shown in FIGURE 10, and FIGURE 12 is a plan view of the rule of the instrument shown in FIGURE 7.

The embodiment of the improved instrument for measuring angles is shown in plan view in FIGURE 1 in the drawings with the FIGURES 2 through 6 showing details of the parts of the same. This improved instrument or gauge is particularly adapted for use by carpenters in determining angles in connection with roof rafters, stair treads, and in mitre joints as an aid in laying out the angles for the cuts to be made on the material to be worked on. In this embodiment, the improved instrument or gauge is identified generally by the numeral 10 and includes a scale plate 11 which is arcuate in form and extends over substantially 90° or a quadrant for measurement purposes. The structural detail of this scale plate is further disclosed in the bottom view of the plate in FIGURE 2 and the elevation view of the plate in FIGURE 3 to indicate that the plate has mounted thereon a plurality of angle iron members or reference sides indicated at 12, 14 and 16 in FIGURE 2 at the undersurface thereof. The angle irons or reference sides 12 and 14 bear 90° relationship to one another and are suitably connected to one another and to the sector like scale plate through means such as welding (not shown). The surface of the scale plate overlaps the quadrant frame of parts 12 and 14 as shown at 20 in FIGURE 2 with the sides 16 being basically the reinforcing side.

Figure 3:
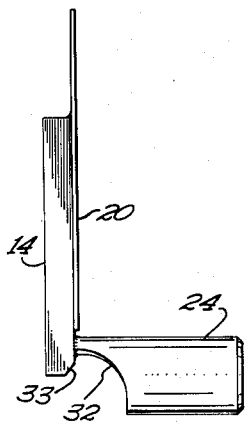
FIGURE 3 is a side elevation view in section of the plate shown in FIGURE 1.
Figure 2:
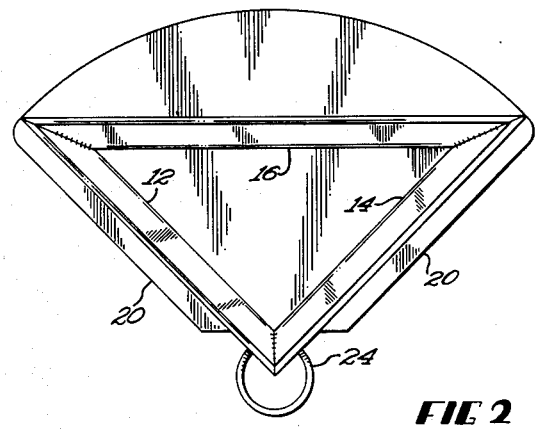
FIGURE 2 is a bottom view of the sector plate for the instrument shown in FIGURE 1.

As will also be seen in FIGURE 1, the arcuate scale plate 11 is cut off near the apex of the same, as at 22, and the angle iron frame parts 12 and 14 have an upstanding cylindrical flange or hub 24 attached thereto as by welding, indicated at 26. This flange or hub 24 is accurately located and attached to the frame of the scale plate such that the axis of the cylindical hub extends through the meeting point of the triangular members 12 and 14 or at the geometric center of the instrument, indicated at 30. As will be seen in FIGURE 3, a portion of the cylindrical hub 24 is removed, as at 32, for the purpose of providing access to the geometrical center of the instrument as will be hereinafter explained. Similarly, a portion of the flange members 12 and 14 which provide the reference sides for the instrument are removed as indicated in FIGURE 3 at 33.

As shown in FIGURE 1, the scale plate 11 or the hub 24 of the same has mounted thereon a rule carrying member indicated generally at 35. This rule carrying member is shown in plan and elevation views in FIGURES 4 and 5 as including a flat or elongated member 36. Member 36 has attached thereto a second cylindrical hub 38 wihch is mounted on member 36 along its extent and is positioned toward one edge thereof. The hub 38 is of internal dimension sufficient to fit over the hub 24 of the scale plate and has a portion removed, as at 40 (see FIGURE 5) adjacent the connection to the member 36. The hub 38 is connected to the member 36 through suitable means, such as welding 26, and it is physically located with respect to an edge 48 of the member 36 such that this edge extends through the axis of the cylindrical hub which coincides with and aligns with the geometrical center of the instrument indicated at 30 in FIGURES 1 and 2. The upper extremity of the cylindrical hub 38 is reduced, as at 42, and this reduced section is splined or slotted to provide a plurality of fingers 43. These fingers, when tension is applied thereto, will grip the surface of the hub 24 positioned within the same when the instrument is assembled. As will be seen in FIGURE 4, a tension band 45 is positioned around the fingers 43 with a suitable turn-buckle 46 connected thereto for clamping the band 45 on the fingers 43 to perform the desired clamping operation of the rule carrying member 35 on the hub 24.

Rule carrying member 35, at one extremity, is narrower than at the opposite extremity of the member. As shown in FIGURE 4, the edge 48 of member 35 extends through the geometrical center of the hub 38 and the opposite extremity of the member 35 has an edge 50 offset from the edge 48 for purposes to be later noted. This extremity of the member 35 includes a notch or slot 52 extending from the end thereof part way along the extent of the member 36 for the purpose of mounting a rule 55. Rule 55 is shown in FIGURE 6 in plan view as having a pair of cylindrical flanges 57 extending transversely thereto, which flanges are adapted to slide into slots 52 in the rule carrying member 55. These flanges are threaded and adapted to receive nuts 58 which thread on the flanges 57 and overlap the edges of the slot 52 to secure the rule to the rule carrying member 35. The rule 55 is cut away or machined, as at 59, so that it can be mounted in the slot 52 in the rule carrying member and the portion removed at 59 will permit the scale edge 60 of the rule to extend into the geometrical center of the hub 38 aligning with the geometrical center 30 of the instrument. The slot 52 is made of sufficient length to permit adjustment of the rule therein to locate the zero or reference portion of the scale 60 at the geometrical center for measurement purposes. The offset extremity or recessed edge 50 of the member 36 permits the scale portion of the rule to be visible under the member 36 and the reduced or removed portions 32 and 40 of the hubs 24 and 38 will permit access of the marking device, such as a scribe or pencil, to be moved from the reference point or the geometrical center of the instrument along the scale edge of the rule for marking purposes.

Thus, in the assembled position or condition for the instrument as shown in FIGURE 1, the rule carrying member 35 with the rule 55 secured thereon will be mounted on the hub 24 of the scale plate 11 or attached thereto with the edge 48 of the rule carrying member 35, overlying a scale on the scale plate 11, such as is indicated generally at 55. This scale plate is marked out in angle subdivisions to represent the quadrant or 90° sector extending from a zero reference point at each reference side to the 45° midpoint of the scale. Related to this angular scale are several additional scales identified as rafter pitch and rafter rises in inches per foot which are normally used in gauges and angle measuring instruments for determining angle cut. These relationships of rafter pitch and rafter rise are fixed and related to the angle scale such that a visual indication may be obtained by reference to the scale of the desired angular relationship in terms of pitch or rise for the adjustment and setting of the instrument. Scale plate 11 at the scale 55 thereon also carries a notation that the hip and valley rafter angular relationships for the same may be inscribed on the scale, if desired. These scales are basically conventional in carpenter type gauges or instruments of this type and the specific details and extent of marking of the same are shown herein basically to indicate that any number of angle scales and relationships may be incorporated thereon.

In the use of this improved instrument for measuring angles for rafter cuts and the like, the instrument is assembled as shown in FIGURE 1 and the rule carrying member thereon is adjusted relative to the scale 55 to the desired rafter angle in terms of pitch or rise or angle. Normally, the pitch and rise scales are utilized for standard cuts since they require no angle computations and the instrument may be adjusted relative to the relationships noted thereon without knowing the actual angles involved. In the marking of rafter angles, the improved instrument is positioned with the left hand edge or reference line facing flush against the rafter board upon which measurement is to be made. The exact length of measurement for the point of cut will be determined prior to the marking of the angle, and when the reference side 12 of the scale plate 11 is positioned against the elongated surface of the rafter board, the rule carrying member 35 with the rule 55 thereon will extend across the board bearing an angular relationship with respect to the extent of the same as set by the edge 48 of the rule carrying member 35 on the scale 55. This setting will be obtained by releasing the clamping turn-buckle 46 and adjusting the member 36 such that the edge 48 rests on the portion of the scale indicating the desired rafter angle in terms of pitch, rise or angle. The reference angle with respect to the side 12 against which the board is positioned and with respect to the rule 55 at the scale surface thereof mounted on the rule carrying member 55 will define the correct angular relationship. Marking of the angle may be made at this time. The cut-away portions of the hubs 38 and 24 permits the stylus or marking pencil to actually extend to the zero or reference point or geometrical center of the instrument flush with the surface of the board as it is engaged by the flange member 12 of the scale plate 11 so that marking completely across the board over the entire extent of the same is provided with this improved angle measuring instrument. For a given rafter pitch setting or a given rafter rise, the instrument in the clamped position may be used repeatedly by so positioning the instrument relative to the board to be cut.

This improved instrument may also be used in the mitring of two boards of equal or unequal width merely by positioning the boards in abutting relationship with the instrument against the edges of the boards so that the angle members 12 and 14 are flush with the edges of the boards to be mitred. The rule carrying member 35 will then be adjusted to the desired mitre angle, normally 45°, and the boards scribed along the scale of the rule 55 to the complete geometric center of the instrument and completely across the board from the outside corner thereof to the inner surface of the board. The remaining board to be marked with an angle for the mitre cut will then be so marked with the instrument in the same setting and with the opposite surface of the instrument or reference side from that previously used bearing against the edges of the second board to be marked. In this position, the second board may be marked with a pencil from the geometric center of the instrument to the extreme edge of the board for completion of the marking. Similarly, the instrument may be used for cutting notches and scribing plumb lines and heel cuts in rafters. Since this procedure is basically conventional, it will not be explained herein, but it will be recognized that an improved advantage is obtained by having a geometrical instrument for measuring angles and permitting scribing of angle markings on a board to be cut from the geometric center of the instrument and entirely across the extent of the board. It will be recognized also, that any size rule may be attached to the instrument and secured in the rule carrying member 35 to permit long measurements.

The embodiment of the improved angle measuring instrument or gauge shown in FIGURE 7 provides an alternate construction which permits wider angle measurements and is somewhat more versatile than the embodiment disclosed in FIGURES 1 through 6. It is particularly adapted for measurement of angle cuts since the instrument may be set and adjusted to provide an angle measurement for both ends of a piece of siding without further adjustment. As in the before mentioned embodiment, the improved angle measuring instrument is shown in assembled relationship in plan view in FIGURE 1 with the parts making up the same, being shown in FIGURES 8–12. In this embodiment, the numeral 70 indicates the general designation of the complete instrument of FIGURE 7. It includes a scale plate 72 which is also arcuate in form which extends over approximately 170° of angle measurement as distinguished from the quadrant scaleplate of the before mentioned embodiment. Scale plate 72 has a reference side or angle bracket 74 attached to one edge of the same, which bracket or member 74 may be suitably secured thereon by welding (not shown). As in the before mentioned embodiment, scale plate 72 has mounted thereon a cylindrical hub 75 which is attached at one extremity to the surface of the scale plate 72 through suitable means such as welding and has a portion of the hub removed (not shown) similar to the construction of the scale plate shown in FIGURE 3. The reference side or the edge of the angle bracket 74 extends through the center of the cylindrical hub to define a geometrical center for the instrument aligned with the axis of the hub and identified by reference numeral 77. Scale plate 72 differs from the before mentioned embodiment in that a second reference side is not rigidly attached to the scale plate but is rather adjustably mounted thereon as will be seen in FIGURES 8 and 9. This second reference side, identified by the number 80, is formed of an angle member having a cylindrical post 82 attached at one extremity thereof. Post 82 is suitably connected to the member 80 such as by welding, indicated at 84 in FIGURE 9, and extends translationally of the extent of the member 80 with a portion of the post removed, as at 85, to provide access to the geometrical center of the instrument, as will be hereinafter defined. The extremity of the member 80 opposite the post 82 has an upstanding part or portion 87 integral with or secured thereto which defines with the extent of the member 80 a slot as at 88, which is designed to fit around the edge of the scale plate when the member 80 is mounted thereon. The portion or part 87 includes a set screw, indicated at 90, which extends through this portion of the member 80 to the slot 88 and will engage the surface of the scale plate 72 when the member 80 is mounted thereon. In addition to the set screw 90, member 80 also mounts a spring snap lock member 92 on the side or edge thereof at the flange portion 87, which lock member is pivoted on the portion 87, as at 94, and has a detent 95 at one extremity thereof adapted to cooperate with an indentation 96 in the portion 87 for the purpose of locking the member 92 in a tilted or pivoted position in which the opposite end of the member 92 engages the surface of the scale plate 72 when the member 80 is mounted thereon. In the assembled position for the member 80 on the scale plate 72, the post 82 is inserted though the cylindrical hub 75 of the scale plate 72. As the post 82 is so inserted, the member 80 must be positioned to one side of the scale plate 72 and rotated such that the edge of the scale plate 72 fits in the notch 88 in the member 80. In this assembled position, the left edge of the exposed flange portion 87 which extends over the surface of the scale plate, as seen in FIGURE 7, will provide the reference side with respect to a scale, indicated generally at 98, positioned on the upper surface of the scale plate. Member 80 will be journalled within the hub 75 of the scale plate and the extremity of the post 82 will extend beyond the upper end of the hub 75. Positioned in the upper end of post 82 is a journalling and retaining collar 99 which bears against the upper surface of the hub 75 to position the post 82 within the hub 75 and retain the member therein. Collar 99 is held in position on the end of the post member 80 through a wing nut 100 which is threaded into a tapped aperture 101 in the upper extremity of the post 82 and bears against the collar 99 securing the same on the end of the post 82.

It will be noted that one of the scales, indicated generally at 98, extends angularly from the reference side through the entire arcuate extent of the scale plate 72 to approximately 170°. A second scale or angle designation extends from the center of the scale plate to the edges thereof. As in the before mentioned embodiment, the right hand portion of the scale includes indicia relating rafter pitch and rafter rise in inches per foot to the angles marked on the scale. It will be recognized that additional scales may be included thereon which are conventional with the type of gauge with which the invention relates. Thus, there is a notation on the scale that hip and valley rafter notations may be included thereon. The present invention is basically directed to an instrument for measuring angles as distinguished from length and, as such, the notations on the scale relate to the angle scale of the sector plate or scale plate for convenience.

As in the before mentioned embodiment, the improved angle measuring instrument includes a rule carrying member 105 shown in plan and elevation views in FIGURES 11 and 10. The rule carrying member includes a flat elongated member 106 having a cylindrical hub 109 suitably attached thereto along its extent and with approximately one-half of the cylindrical hub being secured to the member through suitable means such as welding (not shown). The elongated plate or member 106 has an edge 107 at one extremity or side thereof which extends through the axial center of the cylindrical hub 109 while the opposite extremity of the plate 106 is reduced in width, as at 108, with this portion of the plate or member 106 having a slot 110 included thereon. The rule carrying member 105 at its cylindrical hub 109 has a portion of the same removed, as at 112, to provide access to the geometrical center or axis of the hub 109 which is aligned with the edge 107 of the member 106. The upper extremity of the hub 109 is reduced, as at 115, to provide a plurality of fingers 117, or a splined section, which are designed to be flexible and be clamped against the surface of the hub 75 on the scale plate 72 of the instrument 70. Associated with this splined section or the fingers 117 is a band 120 having a turn-buckle 122 connected thereto which when rotated will tension the band 120 on the fingers 117 clamping this portion of the hub against the surface of the hub 75 on the scale plate 72.

The rule carrying member 105 mounts a rule 125 which is shown in FIGURE 12. Rule 125 has a pair of cylindrical flanges 127 suitable attached thereto and extending transversely from the extent thereof which flanges are threaded and designed to receive nuts 130 mounted thereon. The rule 125 also has a portion of the same removed at one extremity, such as at 132, and the flanges 127 are adapted to slide into the slot 110 in the rule carrying member 105. Nuts 130 when threaded on the flanges 127, overlap the edges of the slot 110 to secure the rule on the rule carrying member 105. The slot 110 is of sufficient length to allow the reference or zero position of a scale 133 on the rule to align with the geometrical center 77 of the instrument. When so mounted, the scale edge of the rule aligns with the edge 107 of the rule carrying member 105 as will be seen in FIGURE 7.

This version or embodiment of the improved angle measuring instrument is particularly adapted for use in the measurement of angles on rafters for end cuts and sill cuts as well as mitre joints between boards of the same dimension or of different widths. In addition, this embodiment is particularly adapted for use in measurement of siding cuts where each end of the board must be cut at an angle. The rule may be so adjusted as to provide angle measurements from reference sides of the instrument for each end of the board and when once adjusted, may be used repeatedly for the same angle indications.

Thus, in this embodiment of the instrument, the scale plate 72 has only one fixed reference side attached thereto, this being provided by the fixed angle member 74 attached thereto. The surface of the scale plate 72 overhangs this reference edge such that the scale plate may be positioned over the edge of the board to be measured with the exposed surface of the member 74 bearing against the edge of the board for a reference position. In the measurement of a rafter cut, only the rule carrying member need be adjusted and such adjustment will be obtained by loosening the turnbuckle 122 and shifting the rule carrying member 105 with the rule 125 attached thereto, such that the reference side 107 aligns with the scales 98 on the scale plate to obtain the desired reference position in terms of rafter pitch, rafter rise or for a given angle designation if such is known. The relationship between the scale edge 133 of the rule 125 and the reference side or angle member 74 on the scale plate will provide the desired angle relationship for the setting of the instrument which will be clamped in this position by again turning the turn-buckle in the opposite direction to clamp the rule carrying member through its band 120 on the hub 75 of the scale plate 72. Any length rule 125 may be positioned on the rule carrying member 105 and the scale surface of the rule due to the removed portion 112 of the hub 109 of the rule carrying member and a similar surface on the hub 75 of the scale plate, together with the removed portion 85 of the post 82 on the adjustable flange member 80 will permit access to the geometrical center of the instrument. Thus, a line may be scribed from the center of the instrument extending completely across the board to be cut. In this manner, plumb lines and angle cuts may be readily obtained and the instrument set and retained in such setting for repeatable measurements and markings.

Similar measurements will be made in connection with mitre cuts of boards of the same or different widths and in such instances, the adjustable side 80 may be moved on the scale plate to the midpoint thereof or the ninety degree position to provide the reference side with this member. In this connection, the scale plate 2 has indentations 135 therein at known angle designations, such as the forty-five, ninety, and one hundred thirty-five degree angle points, so that the member 80 may be moved to these positions and the lock member 92 deflected or pivoted on the portion 87 thereof until the detent 95 at the extremity thereof engages the indentation 96 in the portion 87 to lock the instrument in this position. For all other intermediate positions, the lock member 92 will be retained in its normal or raised position in which the detent 95 is removed from the indentation 96 in the portion 87 and clears the slot 88 in the member such that the member is freely movable with respect to the scale plate through the pivoting of the post 82 on the cylindrical hub 75 of the scale plate 72. To lock the member 80 in an intermediate position, the set screw 90 in the portion 87 thereof will be threaded down into the member 80 to engage the surface of the scale plate 72 in the slot 88 and bear against the same, clamping these parts in a set relationship.

In the measurement of angles on siding, the gauge is set for marking to cut siding for the right-hand end or side of a gable by positioning the reference side 74 against the bottom of the siding. The rule carrying member 105 is then loosened and adjusted to be parallel to the inclined surface of the gable which measurement is usually obtained by tacking the piece of board with parallel sides against the edge of the gable such that the rule carrying member may be adjusted to be parallel to and bear against the same at the scale surface 133 thereof. The rule carrying member is then locked or clamped in this position by operation of the turn-buckle 122 to defined a definite angle relationship between the reference side 74 and the scale side 133 of the rule carrying member. The right-hand end of such siding or gable boards may then be marked with this setting which allows marking from the geometrical center of the instrument 70 on the scale edge of the rule across the entire width of the board. The left-hand end of the gable siding boards are marked by setting the instrument such that the rule carrying member or the scale surface 133 thereof is aligned parallel to the gable or with the surface of a parallel board tacked thereon and with the adjustable flange member 80 moved to a position where it aligns with the bottom of a siding board in a manner similar to the positioning of this surface at the reference member 74 for the right-hand measurement. When the reference flange member 80 is adjusted to this position, the set screw 90 therein may be adjusted to clamp on the surface of the scale plate 72 retaining this angle relationship between the reference surface of the member 80 and the scale surface 133 of the rule carrying member 105 which relationship may be continuously used for cutting the left-hand ends of all of the gable boards or siding boards in a gable.

In addition to the above, this improved gauge may be used in cutting a mitre corner on boards where this mitre angle is greater than ninety degrees. This is obtained by adjusting the reference member 80 to the desired mitre angle position and moving the rule carrying member to a position intermediate or bisecting the mitre angle. Different width boards may be cut in manner previously described with the marking being made completely from the geometrical center across the entire width of the board because of the shape of the instrument parts.

It will be seen that I have provided an improved instrument capable of measurement under conditions extending beyond the present day gauges and providing a definite advantage in allowing access to the geometrical center of the measuring gauge for making purposes. This eliminates an additional step in marking which requires an extension of the line completely across the board after the angle is determined. Further, the improved measuring instrument is rugged in construction, simple in design, and capable of extremely accurate measurement. While I have shown a typical scale surface thereon, it will be understood that different scale and additional information may be provided thereon without departing from the scope of the invention. Therefore, in considering the invention, it should be considered that the present disclosure is intended to be illustrative only and the scope of the invention should be determined only by the appended claims.

I claim:

1. An instrument for determining angles and cuts for rafters, mitre joints, and sidings comprising, an arcuate scale plate having at least one reference side attached thereto, a cylindrical hub attached to the scale plate with a portion of the hub removed at the connection of the hub to the scale plate such that an extension of the reference side is aligned to pass through the axis of said hub, a rule carrying member having a cylindrical hub adapted to fit over the hub on the scale plate and be journalled thereon, said hub having a portion removed at its connection to the rule carrying member, a slot in said rule carrying member for mounting a rule, a rule with flange members attached thereto mounted in the slot in said rule carrying member and secured therein such that the scale edge of the rule extends to the axial center of the hubs on said rule carrying member and said scale plate at the portions removed therefrom, a first flange associated with said scale plate bearing a predetermined relationship to the reference side of said scale plate, the flexible clamping means included in the hub of said rule carrying member and adapted to clamp the hub of said rule carrying member on the hub attached to the scale plate for a fixed angular relationship therebetween after adjustment.

2. The instrument for determining angles and cuts for rafters, mitre joints and sidings of claim 1 in which the flange associated with the scale plate is physically attached normal to the reference side thereof and in which the reference side includes a flange adapted to bear against an object upon which measurement is to be made by said instrument.

3. The instrument for determining angles and cuts for rafters, mitre joints and siding of claim 1 in which the flange is adjustably mounted on the scale plate and adapted to be movable relative to the arcuate scale plate for varying angular relationships with the reference side of said scale plate.

4. The instrument for determining angles and cuts for rafters, mitre joints and siding of claim 1 in which the flexible clamping means included on the hub of said rule carrying member includes a splined extremity of the cylindrical hub and a band and clamp positioned thereon to clamp the hub of said rule carrying member to the hub on the scale plate.

5. The instrument for determining angles and cuts for rafters, mitre joints and siding of claim 1 in which the flange associated with the scale plate includes a cylindrical post and a transversely extending flange member with the post having a portion cut away and positioned within and concentric with the hub of said scale plate and said rule carrying member and including guide means at the opposite extremity of said flange member extending to the upper surface of the scale plate to retain the flange member in selectively fixed positions relative to the scale plate.

6. The instrument of claim 5 and including clamping means threaded into the post of said second flange and bearing against the hub of said scale plate to retain the second post of said second flange on said scale plate.

7. The instrument of claim 6 in which the flange is adjustable relative to the scale plate over a range of approximately 170° relative to the reference side and in which the rule carrying member is adjustable on the hub of the scale plate for angular movement relative to the reference side over a range of approximately 170°.

8. An instrument for determining angles and cuts for rafters, mitre joints, and siding comprising in combination, an arcuate scale plate having an angular scale thereon and relationships between rafter rise and rafter pitch relative to the angular scale, a pair of angle members attached to the scale plate and providing flanges thereon disposed in quadrature relationship to one another, a pivot member attached to the scale plate such that its axis forms the geometric center of the instrument and extends through a point of geometric center of the instrument with reference to the quadrature flanges, said pivot member being so connected to the scale plate that the flanges and said pivot member physically do not extend into said geometric center, a pivoted rule carrying member mounted on the pivot member of said scale plate movable relative thereto, means for releasably attaching a rule to said rule carrying member, said rule carrying member and said attaching means being so constructed that a rule mounted thereon will have a scale edge extending from the geometric center of said instrument and such that said geometric center will be accessible from the marking standpoint, means adjustably clamping said rule carrying member on the pivot of said scale plate, said rule carrying member including an extension overlying said scale plate and cooperating with the scale thereon to relate the angular displacement of said rule carrying member relative to said scale plate.

No references cited.

ISAAC LISANN, *Primary Examiner.*